United States Patent
Kuzmin

(10) Patent No.: US 9,317,402 B2
(45) Date of Patent: *Apr. 19, 2016

(54) METHODS AND SYSTEMS FOR GENERATING TEST INFORMATION FROM A SOURCE CODE

(71) Applicant: Zynga Inc., San Francisco, CA (US)

(72) Inventor: Aleksandr Kuzmin, Santa Clara, CA (US)

(73) Assignee: Zynga Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/663,321

(22) Filed: Mar. 19, 2015

(65) Prior Publication Data

US 2015/0193333 A1  Jul. 9, 2015

Related U.S. Application Data

(63) Continuation of application No. 13/323,745, filed on Dec. 12, 2011, now Pat. No. 9,003,379.

(51) Int. Cl.
*G06F 9/44* (2006.01)
*G06F 9/45* (2006.01)
*G06F 11/36* (2006.01)

(52) U.S. Cl.
CPC .............. *G06F 11/3676* (2013.01); *G06F 8/72* (2013.01); *G06F 11/368* (2013.01); *G06F 11/3684* (2013.01)

(58) Field of Classification Search
None
See application file for complete search history.

(56) References Cited

U.S. PATENT DOCUMENTS

| | | | | | |
|---|---|---|---|---|---|
| 5,613,118 | A | * | 3/1997 | Heisch et al. | 717/158 |
| 5,909,577 | A | * | 6/1999 | Devanbu | 717/127 |
| 6,983,455 | B2 | * | 1/2006 | Kuzmin | 717/130 |
| 7,039,902 | B2 | * | 5/2006 | Kuzmin et al. | 717/126 |
| 7,080,358 | B2 | * | 7/2006 | Kuzmin | 717/127 |
| 9,003,379 | B2 | * | 4/2015 | Kuzmin | 717/130 |
| 2003/0093716 | A1 | * | 5/2003 | Farchi et al. | 714/34 |
| 2006/0053414 | A1 | * | 3/2006 | Bhandari et al. | 717/133 |
| 2011/0154300 | A1 | * | 6/2011 | Rao et al. | 717/133 |
| 2012/0278793 | A1 | * | 11/2012 | Jalan et al. | 717/158 |
| 2013/0152043 | A1 | * | 6/2013 | Kuzmin | 717/110 |
| 2015/0193333 | A1 | * | 7/2015 | Kuzmin | 717/124 |

* cited by examiner

*Primary Examiner* — Marina Lee

(74) *Attorney, Agent, or Firm* — Martine Penilla Group, LLP

(57) ABSTRACT

Systems and methods for generating test information from a source code are described. One of the methods includes accessing the source code. The method further includes receiving a modification of the source code to generate a modified source code. The modification includes one or more instructions that do not affect functions performed by executing the source code. The modification further includes one or more instructions for generating test information regarding each executable line of the source code.

20 Claims, 13 Drawing Sheets

```
>>----
>>@implementation WorldLayer            ← Definition 322
>>
>>@synthesize entitiesNode;              ← Definition 324
>>
>>- (id)init                              ← Action statement 326
>>{
>>   if((self = [super init]))           ← Condition statement 328
>>   {
>>      entitiesNode = [[[CCAtlasNode alloc] init]  ⎫
>>      autorelease];                              ⎬ Action statement 330
>>      [self addChild:entitiesNode z:cZOrderEntities ⎫
>>      tag:cTagEntitiesNode];                        ⎬ Action statement 332
```

```
>> @implementation WorldLayer          ← Definition 322
>>
>> @synthesize entitiesNode;           ← Definition 324
>>
>> - (id)init                          ← Action statement 326
>> { printf("JSCOV: Clients/ios/shared/toybox/Iphone/Game/WorldLayer.m 41   ⎬ 350
>> init fn");
                                                                           ⎬ 352
>> printf("JSCOV: Clients/ios/shared/toybox/Iphone/Game/WorldLayer.m 43
>> init\n");              if((self = [super init]))  ———— Condition statement 328
>>                                                                         ⎬ 354
>> printf("JSCOV: Clients/ios/shared/toybox/Iphone/Game/WorldLayer.m 45
>> init\n");              entitiesNode = [[[CCAtlasNode alloc] init]  ———— Action statement 330
>>                        autorelease];                                    ⎬ 356
>>                   330
>> printf("JSCOV: Clients/ios/shared/toybox/Iphone/Game/WorldLayer.m 46
>> init\n");              [self addChild:entitiesNode z:cZOrderEntities    ———— Action statement 332
>> tag:cTagEntitiesNode];
                      332
```

| | | |
|---|---|---|
| 85.8% | 73 | 85 | Clients/ios/shared/ZMobileEngine/ZMComponents/ZMStretchButton.m |
| 86.2% | 25 | 29 | Clients/ios/shared/ZMobileEngine/ZMTransactions/Transactions/ZMStatsTransaction.m |
| 87.2% | 48 | 55 | Clients/ios/Source/ActionHarvestEntity.m |
| 87.5% | 14 | 16 | Clients/ios/sahred/ZMobileEngine/CMComponents/ZMLocalization/ZMLocalizationToken.m |
| 88.1% | 82 | 93 | Clients/ios/shared/toybox/Iphone/Engine/MultiStepManager.m |
| 89% | 237 | 266 | Clients/ios/shared/ZMobileEngine/ZMUI/FrontLabel/ZMCFrontLabel.m |
| 90.9% | 50 | 55 | Clients/ios/shared/toybox/Iphone/Engine/DownloadFileOperation.m |
| 91.1% | 72 | 79 | Clients/ios/shared/toybox/Iphone/Engine/SpriteTable.m |
| 91.6% | 11 | 12 | Clients/ios/Source/ActionFade.m |
| 92.3% | 12 | 13 | Clients/ios/shared/ZMobileEngine/ZMComponents/ZMLocalization/ZMLocalizationName.m |
| 96.5% | 83 | 86 | Clients/ios/shared/ZMobileEngine/ZMComponents/ZMLocalization/ZMLlocalizedString.m |
| 97.2% | 35 | 36 | Clients/ios/Source/MarketTableViewCell.m |
| 98.1% | 158 | 161 | Clients/ios/Source/Config+City.m |
| 98.1% | 53 | 54 | Clients/ios/Source/UIManager+City.m |
| 98.7% | 80 | 81 | Clients/ios/Source/ProgressBar.m |

Continued from Figure 9A

| | | |
|---|---|---|
| 100% | 5 | 5 | Clients/ios/Shared/ZMobileEngine/ZMTransaction/Transaction/ZMGetPotentialNeighborsTransaction.m |
| 100% | 2 | 2 | Clients/ios/Source/ProtoCEnergy.m |
| 100% | 4 | 4 | Clients/ios/Source/CityGetPotentialNeighborsTransaction.m |
| 100% | 2 | 2 | Clients/ios/Source/ActionVillager.m |
| 100% | 10 | 10 | Clients/ios/Source/ExperimentManager.m |
| 100% | 5 | 5 | Clients/ios/shared/ZMobileEngine/ZMTransactions/Transaction/ZMGetIAPProductsTransaction.m |
| 100% | 40 | 40 | Clients/ios/Source/ProductCell.m |
| 100% | 7 | 7 | Clients/ios/shared/toybox/Iphone/Cocos/CCSchedule+Timer.m |
| 100% | 2 | 2 | Clients/ios/Source/WorldEdge.m |
| 100% | 15 | 5 | Clients/ios/Source/ProtoCCurrency.m |
| 100% | 19 | 19 | Clients/ios/Source/CitySpriteBatchNode.m |
| 100% | 1 | 1 | Clients/ios/Source/ImageCache+City.m |
| 100% | 22 | 22 | Clients/ios/Source/ActionEnter.m |
| 100% | 8 | 8 | Clients/ios/Source/ZCityGetNeighborsTransaction.m |
| 100% | 17 | 17 | Clients/ios/shared/ZMobileEngine/ZMComponents/ZMLocalization/substituters/SubstituerSimple.m |

```
1779: 157071    4.250         static int jk_parse_next_token(JKParseState *parseState) {
1780: 157072    0.052   1%    BSCParameterAssert((parseState != NULL) && (JK_AT_STRING_PTR(parseState) <=
JK_END_STRING_PTR(parseState)));
1781: 157071    0.052   1%    const unsigned char *atCharacterPtr = NULL;
1782: 157071    0.050   1%    const unsigned char *endOfStringPtr = JK_END_STRING_PTR(parseState);
1783: 157071    0.051   1%    unsigned char currentCharacter        = 0U;
1784: 157072    0.051   1%    int             stopParsing           = 0;
1785
1786: 157071    0.050   1%    parseState->prev_atIndex        = parseState->atIndex;
1787: 157069    0.053   1%    parseState->prev_lineNumber     = parseState->lineNumber;
1788: 157070    0.049   1%    parseState->prev_lineStartIndex = parseState->lineStartIndex;
1789
1790: 157071    0.051   1%    jk_parse_skip_whitespace(parseState);
1791
1792: 157070    1.078  25%    if((JK_AT_STRING_PTR(parseState)        == endOfStringPtr)) { stopParsing = 1;    }
1793
1794: 157070    0.050   1%    if((JK_EXPECT_T(stopParsing == 0)) && (JK_EXPECT_T((atCharacterPtr =
JK_AT_STRING_PTR(parseState)) < endOfStringPtr))) {
1795: 157071    0.052   1%    currentCharacter = *atCharacterPtr;
1796
1797: 157071    0.051   1%    if(JK_EXPECT_T(currentCharacter == '"')) { if(JK_EXPECT_T((stopParsing =
jk_parse_string(parseStatus)) == 0)) { jk_set_parsed_token(parseState,
```

FIG. 10

```
10
11  @implemention ZMLLocalizationName ← Definition
12
13  @synthetic name;  ← Definition
14
15                                              ← Declaration
16  - (id)toStandardObjects  {
17  :0   return [MSDictionary dictionaryWithObjectsAndKeys:name,@"name",  ← Action statement
18
19
20       (self.attributes allObjects), @"attributes",  ⎫
21       nil};                                          ⎬ Definition & declarations
22  }  ← Declaration                                   ⎭
23
24                                    ← Declaration
25  :4  - (NSString *)string {
26       return name;  ← Action statement
27
28  }  ← Declaration
29
```

METHODS AND SYSTEMS FOR GENERATING TEST INFORMATION FROM A SOURCE CODE

CLAIM OF PRIORITY

This application is a continuation of and claims the benefit of and priority, under 35 U.S.C. §120, to application Ser. No. 13/323,745, filed on Dec. 12, 2011 and titled "Methods and Systems for Generating Test Information From a Source Code", and issued on Apr. 7, 2015 as U.S. Pat. No. 9,003,379, which is incorporated by reference herein in its entirety.

FIELD

The present invention relates to methods and systems for generating test information from a source code.

BACKGROUND

Software programming has gained popularity and is continuing to gain popularity. Specifically, software programming for games creates excitement both among players and software programmers. In software programming, a software programmer writes a computer program using a computer programming language, such as C, C++, Assembly Language, etc.

Once the computer program is written, the computer program is compiled. If the computer program compiles, there may not be an error in the computer program. On the other hand, if the computer program does not compile, there usually is an error in the computer program. However, if the computer program is large, it is difficult to debug the computer program.

It is within this context that various embodiments of the present invention arise.

SUMMARY

Embodiments of the present invention provide methods and systems for generating test information from a source code.

In one embodiment, a tester module is provided. The tester module tests each executable line of a source code to generate test information. In some embodiments, an executable line excludes a line of the source code that includes only a declaration, excludes a line of the source code that includes only a definition, excludes a line of the source code that includes only a function prototype, and/or excludes a line of the source code that is empty. Moreover, in one embodiment, an executable line includes a line of the source code that includes a condition statement and/or an action statement. A condition statement provides a condition for performing an action that is indicated in an action statement. Moreover, in various embodiments, a non-executable line is not tested. By testing each executable line of the source code, a user can look at a result of the test to quickly and easily determine the executable line that has an error. The user can fix the error to debug the source code.

In another embodiment, a method for generating test information from a source code is described. The method includes accessing the source code. The method further includes receiving a modification of the source code to generate a modified source code. The modification includes one or more instructions that do not affect functions performed by executing the source code. The modification further includes one or more instructions for generating test information regarding each executable line of the source code.

In yet another embodiment, a method for generating test information from a source code is provided. The method includes accessing the source code. The method further includes modifying the source code with one or more instructions to provide coverage information related to each executable line of the source code or consumption information related to each executable line of the source code. The operation of modifying the source code is performed to generate a modified source code. Moreover, the operation of modifying is performed to modify each executable line of the source code.

In still another embodiment, a computer system for generating test information from a source code is described. The computer system includes an input device for receiving a modification of the source code from a user. The computer system further includes an output device for providing test information, a memory device for storing the source code, and a processor. The processor is used for accessing the source code from the memory device. The processor is further used for generating a modified source code in response to receiving the modification. The modification includes one or more instructions that do not affect functions performed by executing the source code. Moreover, the modification includes one or more instructions for generating test information for each executable line of the source code.

Other aspects of the present invention will become apparent from the following detailed description, taken in conjunction with the accompanying drawings, illustrating by way of example the principles of various embodiments of the present invention.

BRIEF DESCRIPTION OF THE DRAWINGS

Various embodiments of the present invention may best be understood by reference to the following description taken in conjunction with the accompanying drawings in which:

FIG. 6 shows an ObjectiveC source code, in accordance with one embodiment of the present invention.

FIG. 7 shows a modified ObjectiveC source code, in accordance with one embodiment of the present invention.

FIG. 9A is a portion of a view of a table that includes test information, in accordance with one embodiment of the present invention.

FIG. 9B is the remaining portion of the table illustrated in FIG. 9A, in accordance with one embodiment of the present invention.

FIG. 10 is a view of an embodiment of a table that includes test information for each executable line, in accordance with one embodiment of the present invention.

FIG. 11 shows a source code to illustrate coverage of executable lines of the source code, in accordance with one embodiment of the present invention.

DETAILED DESCRIPTION

It should be noted that various embodiments of the present invention may be practiced without some or all of these specific details. In other instances, well known process operations have not been described in detail in order not to unnecessarily obscure various embodiments of the present invention.

Figure 1:
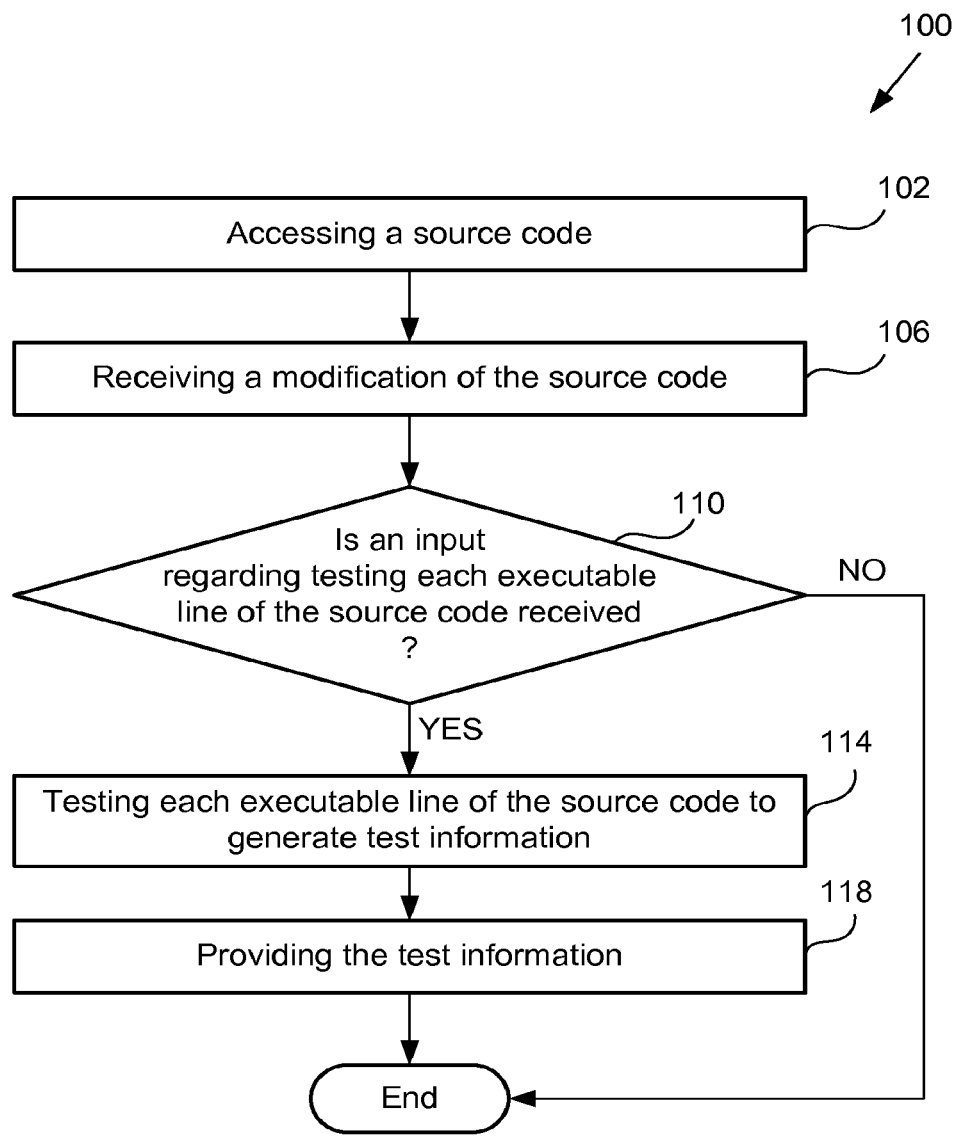
FIG. 1 is a flowchart of a method for generating test information from a source code, in accordance with one embodiment of the present invention.

FIG. 1 is a flowchart of an embodiment of a method 100 for generating test information from a source code. In one embodiment, the method 100 is performed by a processor or a combination of processors. It is noted that a processor, as used herein, refers to a central processing unit (CPU), a microprocessor, an application specification integrated circuit (ASIC), or a programmable logic device (PLD). In some embodiments, a processor is located within a physical server or a computer.

As an example, the source code is a C computer program, a C++ computer program, an ObjectiveC computer program, or a Java computer program. As another example, a processor is incapable of using the source code directly to perform an action of the source code. As yet another example, the source code is a game code that is executed to play a multimedia game, such as, a Cityville™ game, a Farmville™ game, a Forestville™ game, a Holiday Town™ game, or a Poker™ game, all of which are available from Zynga Corporation of San Francisco, Calif. A multimedia game includes an audio output or a video output or an animation output or a combination thereof. In some embodiments, the source code is a computer program for a word processor application, an excel spreadsheet application, an email application, or an Internet browser application.

In operation 102, a source code is accessed 102. The source code is accessed from a memory device, such as, for example, a read-only memory (ROM) or a random access memory (RAM) or a combination thereof. A memory device is an example of a computer-readable medium. The source code is read from the memory device to access the source code. The source code includes one or more executable lines and is in a form other than a binary form.

In one embodiment, an executable line is a statement that extends across one or more mathematical lines, such as a line 1 and a line 2, and the statement is used to specify an action to be performed by a processor or a condition, the truth or falsity of which is to be checked by the processor. In some embodiments, an executable line is a statement that extends across a portion of a mathematical line. A statement is a condition statement or an action statement. An output of a condition is true or false. In some embodiments, a condition statement is executed by a processor to check whether a condition in the condition statement is true or false. In one embodiment, an action statement is executed to assign a value to a variable, to perform an arithmetic operation, and/or to perform a logical operation. An output of an action statement may be one or more values and/or one or more characters.

As an example, a statement includes a keyword, such as 'for', 'if', 'goto', 'else', 'void', 'id', 'return', 'while' (while loop), 'char', 'int', 'loop', or 'long'. As an example, the 'if' keyword is used to determine whether an input is received from a real world user. As another example, the 'while' keyword is used to determine whether less than a certain number of game points are accumulated by the real world user. In one embodiment, a keyword is a condition for performing one or more actions. In some embodiment, a keyword is executed to performing an action. A statement that includes more than one keyword is a compound statement. A statement that includes one keyword is a simple statement. As yet another example, a statement includes an operator, such as an arithmetic operator (e.g., '+', '−', '*', '/', '%'), a Boolean logic operator (e.g., '!', '&'), an increment operator (e.g. '++'), or a decrement operator (e.g., '−−').

As another example, an executable line is a declarationless line. For example, an executable line excludes a mathematical line that includes only a declaration. A declaration declares a data type, such as, whether a type of a variable is an integer or a character.

As yet another example, an executable line excludes a mathematical line that includes only a preprocessing directive (e.g., #include <text>, @text). The preprocessing directive causes a compiler program to replace a line having the preprocessing directive with the text within the processing directive.

As another example, an executable line is a definitionless line. For example, an executable line excludes a mathematical line that includes only a definition. A definition names a function within the source code. A name of a function may be 'main', 'secondary', etc. A second function is called by a first function with a name of the second function. For example, a 'main' function calls the second function with a name of the second function. In some embodiments, the second function calls the second function with a name of the second function. In one embodiment, a function is defined between a punctuation mark, such as an open bracket (e.g, open curly bracket '{') and another punctuation mark, such as a close bracket (e.g., close curly bracket '}').

In one embodiment, a function is defined using one or more conditional statements, which are executed to determine truth or falsity of one or more conditions. Moreover, a function is defined using one or more action statements, which are executed to provide one or more outputs. In this embodiment, execution of the one or more action statements depends on truth or falsity of the one or more conditions.

In some embodiments, a function is defined using one or more action statements, the execution of which does not depend on a truth or falsity of a condition.

In one embodiment, a function provides one or more arithmetic results based on one or more arithmetic operations, one or more logic results based on one or more logic operations, or one or more results based on one or more arithmetic results and one or more logic operations.

As an example, a function is executed by a processor to allow a virtual user in a game to perform an action, such as walking, building a virtual home, demolishing a virtual building, deducting credits from an account used to play the game, transferring credits from one gaming account to another gaming account, chopping virtual trees, selling virtual gold coins, or entering a virtual home. As another example, a function is performed to display a prompt to the real user regarding an operation in a game.

As yet another example, an executable line excludes a mathematical line that includes only a function prototype. In other words, an executable line is a function prototypeless line. A function prototype excludes an action statement and/or a condition statement of a function but includes a name of the function, a data type that is input to the function, and/or includes a data type that is output as a result of execution of the function. Examples of a data type include a floating point number, a character, and an integer.

As another example, an executable line excludes a mathematical line that includes only a comment. In other words, an executable line is a commentless line. A comment within a mathematical line of a source code is used to help the real user understand a meaning of a portion of the source code in the mathematical line. In some computer programming languages, a comment starts with a forward slash followed by an asterisk ("/*") and ends with another asterisk followed by another forward slash ("*/").

As still another example, an executable line is other than a non-executable line. The non-executable line is ignorable by a compiler program. A compiler program is executed by a processor to compile the source code into an object code, which is understandable by a processor. For example, the object code is in a binary form.

As another example, an executable line excludes a mathematical line that includes only an empty space. In other words, an executable line is a non-empty line. In one embodiment, a non-empty line includes at least one character that is other than a space character.

In some embodiments, each executable line is a declarationless line, a definitionless line, a function prototypeless line, a commentless line, and a non-empty line. In various embodiments, each executable line is a declarationless line, a definitionless line, a function prototypeless line, a commentless line, and/or a non-empty line.

In operation 106, a modification of the source code is received. For example, the source code is modified, via an input device, which is described below, by a real user with one or more instructions to generate a modified source code. In this example, the real user uses the input device to prepend each executable line of the source code with an instruction to generate a modified executable line. One or more modified executable lines form the modified source code. The one or more instructions are executed by a processor to generate test information, described below, regarding the source code.

The modification is not performed to modify a function of the source code. For example, a processor upon receiving the modification determines whether a function of the source code is modified. Upon determining so, the processor generates a prompt that is displayed, via a display device, described below, to the real user and the prompt indicates that the modification affects the function of the source code. On the other hand, upon determining that the modification does not affect the function of the source code, the processor avoids generating the prompt.

In some embodiments, instead of receiving the modification from the real user, a processor is programmed to modify the source code upon accessing the source code. There is no manual input received from the real user upon accessing the source code to modify the source code. In these embodiments, a processor inserts the one or more instructions into the source code to modify the source code.

In operation 110, it is determined whether an input is received from the real user via the input device to test each executable line of the source code. Upon determining that there is a lack of reception of the input, the method 100 ends. In some embodiments, upon determining that there is a lack of reception of the input, a processor continues to determine whether the input is received.

On the other hand, in response to determining that the input is received, in operation 114, each executable line of the source code is tested. For example, the one or more instructions are executed using a tester module, which is described below, to generate the test information regarding the source code. In some embodiments, the tester module is executed by a test processor, which is the same as a processor that performs the operation 110 but is different than a processor that performs the operations 102 and 106.

In one embodiment, the test information includes coverage information, consumption information, and/or other test information. The coverage information provides a number of times each executable line of the source code is executed during the test. For example, a first executable line of the source code is executed twice during the test and a second executable line of the source code is executed once during the test.

In some embodiments, the coverage information provides a percentage of a total number of executable lines within a source code. The percentage is a percentage of a number of executable lines that are executed by a processor during a test.

The consumption information provides percentage of a time cycle, of a hardware resource, consumed by execution of an executable line during the test. For example, the first executable line consumes 0.25% of a CPU time cycle that is counted during execution of the source code during the test and the second executable line consumes 0.5% of the CPU time cycle. Examples of a hardware resource include a CPU and a memory device.

The other test information includes a ratio of a number of loop condition statements within an executable line of the source code to a number of function calls within the source code. In some embodiments, the other test information includes a ratio of a number of loop condition statements within an executable line of the source code to a number of function calls that are made within one or more functions of the source code. If the ratio is higher than or equal to a threshold, the ratio indicates to the real user that execution of an executable line consumes a large percentage of a hardware resource time cycle. On the other hand, if the ratio is lower than the threshold, the ratio indicates that execution of an executable line consumes a medium number or a low number of a hardware resource time cycle.

In some embodiments, instead of the ratio, an inverse ratio is calculated. For example, an inverse ratio of a function call within an executable line within the source code to a number of loop condition statements within the source code is determined. In some embodiments, the inverse ratio of a function call within an executable line to a number of loop condition statements within one or more functions of the source code is determined. If the inverse ratio is lower than the threshold, the inverse ratio indicates to the real user that execution of an executable line consumes the large percentage of a hardware resource time cycle. On the other hand, if the ratio is equal to or higher than the threshold, the inverse ratio indicates that execution of an executable line consumes the medium number or the low percentage of a hardware resource time cycle.

In other embodiments, instead of a ratio of a loop condition statement within an executable line of the source code to a number of function calls within the source code, a ratio of a number of loop condition statements within the entire source code to a number of function calls within the entire source code is determined.

Similarly, in one embodiment, instead of an inverse ratio of a function call within an executable line of the source code to a number of loop condition statements within the source code, an inverse ratio of a number of function calls within the entire source code to a number of loop condition statements within the entire source code is determined.

Continuing with FIG. 1, in operation 118, the test information is provided. For example, the test information is sent via a network, described below, to a computer. As another example, the test information is provided to a display device to display the test information. As yet another example, the test information is provided to a printer to print the test information. The method 100 ends upon providing the test information.

Figure 2:
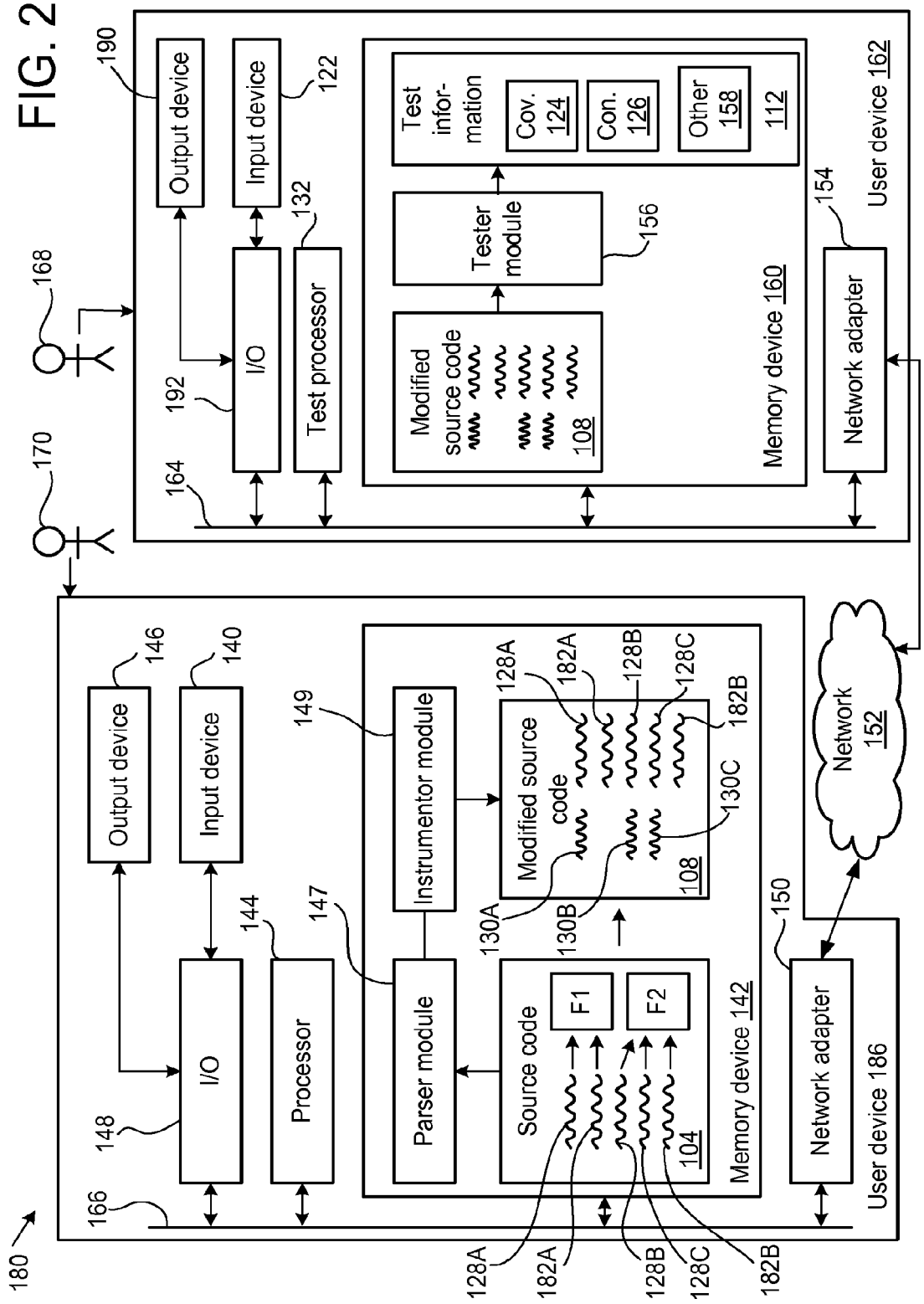
FIG. 2 is a block diagram of a system for generating a modified source code and testing a source code, in accordance with one embodiment of the present invention.

FIG. 2 is a block diagram of an embodiment of a system 180 for generating a modified source code 108 and testing a source code 104. The source code 104 includes one or more executable lines 128 and one or more non-executable lines 182.

A real user 170 uses an input device 140 to request a processor 144 to access the source code 104 from a memory device 142. Examples of an input device include a keyboard, a touchscreen of a display device, a mouse, a stylus, or a combination thereof. Upon receiving the request from the real user 170, the processor 144 reads the source code 104 from the memory device 142 and provides the source code 104 to an output device 146. Examples of an output device include a printer or a display device, such as a cathode ray tube (CRT) display device, a liquid crystal (LCD) display device, a plasma display device, or a light emitting diode display device. In some embodiments, an input device and an output device are integrated, such as within a touchscreen display device. The input device 146 and the output device 146 are coupled with a bus 166 via an input/output (I/O) interface 148. In some embodiments, an I/O interface includes a driver to drive an output device and/or a port that provides compatibility between a bus and an input device or an output device. In one embodiment, an input device and/or an output device is located outside a user device, which is described below.

Upon providing a representation, such as a printout or a display, of the source code 104 on the output device 146, the user 170 modifies the source code 104 using the input device 140. The user 170 inserts one or more instructions 130 to modify the source code 104.

The user 170 prepends instructions 130 to one or more executable lines 128. For example, the user 170 prepends the instruction 130A to the executable line 128A, prepends the instruction 130B to the executable line 128B, and the instruction 130C to the executable line 128C. The user 170 avoids prepending an instruction to the non-executable line 182A and avoids prepending an instruction to the non-executable line 182B.

In some embodiments, there is no provision of the source code 104 on the output device 146. In these embodiments, the processor 144 modifies the source code 104 by inserting one or more instructions 130 into the source code 104 to generate the modified source code 108. The processor 144 executes a parser module 147 to distinguish executable lines 128 within the source code 104 from non-executable lines 182. Moreover, the processor 144 executes an instrumentor module 149 to prepend the executable lines 128 with instructions 130.

It should be noted that the processor 144 is used to execute the parser module 147 and the instrumentor module 149 in case the source code 104 includes a large number of executable lines. When the source code 104 includes the large number of executable lines, it is difficult for the real user 170 to distinguish the executable lines from non-executable lines of the source code 104 and to prepend the executable lines with instructions.

The processor 144 stores the modified source code 108 in the memory device 142 and/or sends the modified source code 108 via a network adapter 150 and a network 152 from a user device 186 to another user device 162. In some embodiments, an input device, a network adapter, and/or an output device are located outside a user device.

The network 152 is a wired network, such as the Internet or an Intranet, or a combination of the wired network and a wireless network, or a combination thereof. In some embodiments, the network adapter 150 is a network interface card (NIC) that supports wired Ethernet standard or WiFi wireless standard.

A network adapter 154 of a user device 162 receives the modified source code 108 from the network 152 and stores the modified source code 108 in a memory device 160. A test processor 132 waits for a request from a user 168 to test the modified source code 108 by using a tester module 156.

Upon receiving the request from the user 168, the test processor 132 accesses the modified source code 108 from the memory device 160 and executes the tester module 156 to test the source code 104. In some embodiments, the test processor 132 avoids waiting for the request from the user 168. In these embodiments, the test processor 132 accesses the modified source code 108 when the modified source code 108 is stored in the memory device 160 and executes the tester module 156 to test the source code 104. The tester module 156 is a computer program that executes the one or more instructions 130 and the executable lines 128 to generate the test information.

In some embodiments, the tester module 156 executes the executable lines 128 and avoids executing the non-executable lines 182. For example, the tester module 156 reads each mathematical line of the modified source code 108 to determine whether the mathematical line includes any of instructions 130. Upon determining that the mathematical line excludes any of instructions 130, the tester module 156 skips the mathematical line to avoid executing the line. On the other hand, upon determining that the mathematical line includes any of instructions 130, the test module 156 executes the instruction and one of executable lines 128 that is appended to the instruction.

The test processor 132 executes the tester module 156 with the modified source code 108 to generate test information 124 for each of the executable lines 128. In some embodiments, the test information 124 is information regarding each of the executable lines 128 and excludes information regarding each of the non-executable lines 182. The test information 124 includes coverage information 124, consumption information 126, and other test information 158. The test processor 132 provides the test information 112 from the memory device 160 to an output device 122, which outputs a representation of the test information 112 to a real user 168. The real user 168 is able to see a representation of the test information 124 for each executable line 128.

In some embodiments, the operations performed by the processor 144 and the test processor 132 are performed by a single processor. In other embodiments, the operations performed by the processor 144 and the test processor 132 are performed by more than two processors.

Moreover, in one embodiment, the operations performed by the user device 186 and the operations performed by the user device 162 are performed with a single user device.

Figure 3:
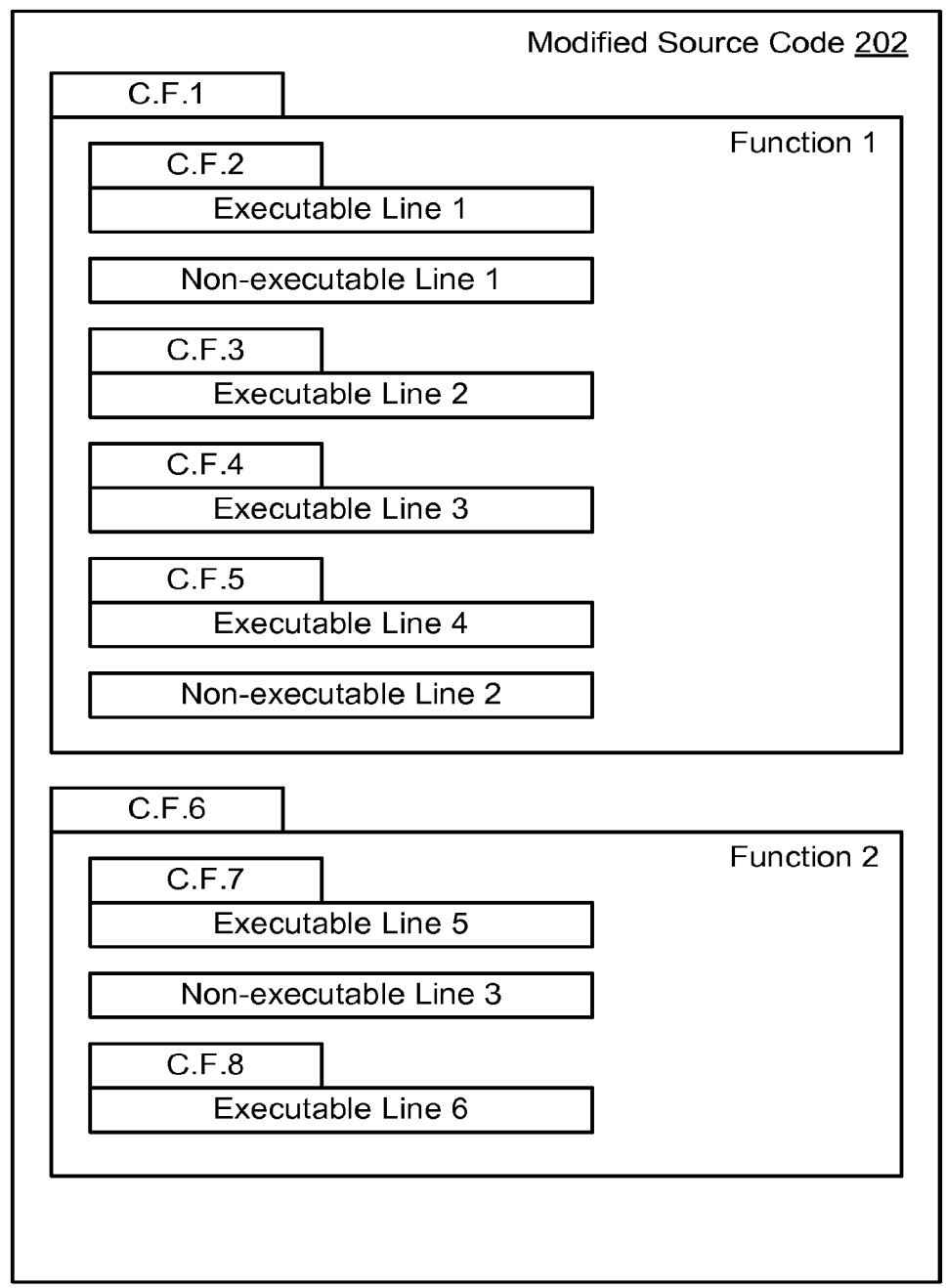
FIG. 3 is a diagram of a modified source code, in accordance with one embodiment of the present invention.

FIG. 3 is a diagram of an embodiment of a modified source code 202. The modified source code 202 includes two functions, function 1 and function 2. The function 1 is prepended with a collection function 1 and the function 2 is prepended with a collection function 2.

In one embodiment, a collection function is prepended to a function to inform test processor 132 that the function is being entered into to execute the function. If the function is not exited from at end of execution of the function, the test processor 132 determines that the function crashed. Otherwise, the test processor 132 determines that the function is executed.

Moreover, the function 1 includes executable lines 1, 2, 3, and 4 and the function 2 includes executable lines 5 and 6. Each executable line 1 thru 6 is prepended with a corresponding collection function. For example, the executable line 1 is prepended with a collection function 2, the executable line 2 is prepended with a collection function 3, the executable line 3 is prepended with a collection function 4, the executable line 4 is prepended with a collection function 5, the executable line 5 is prepended with a collection function 7, and the executable line 6 is prepended with a collection function 8.

In one embodiment, a collection function is prepended to an executable line to inform test processor 132 that the executable line is being entered into to execute the executable line. If the executable line is not exited from at end of execution of the executable line, the test processor 132 determines that the executable line crashed. Otherwise, the test processor 132 determines that the executable line is executed.

In some embodiments, a function or an executable line crashes when the function of the executable line has a large polynomial, a large exponent, or an unrecognizable keyword that cannot be recognized by the test processor 132.

It should be noted that non-executable lines 1, 2 and 3 are not prepended with collection functions. For example, there is a lack of insertion of a collection function that collects test information regarding the non-executable line 1, a lack of insertion of a collection function that collects test information regarding the non-executable line 2, and a lack of insertion of a collection function that collects test information regarding the non-executable line 3.

A collection function is an instruction that collects test information regarding an executable line or a function to which the collection function is prepended, creates a binary nested table in which each column includes a type of information, such as consumption information, coverage information, or other test information, and generates a file that includes the nested table.

In some embodiments, the source code 202 includes any number of functions, such as functions 1 and 2, and each function includes any number of executable lines and/or any number of non-executable lines. In one embodiment, instead of a collection function, an executable line is prepended with another instruction, such as a 'printf' function.

Figure 4:
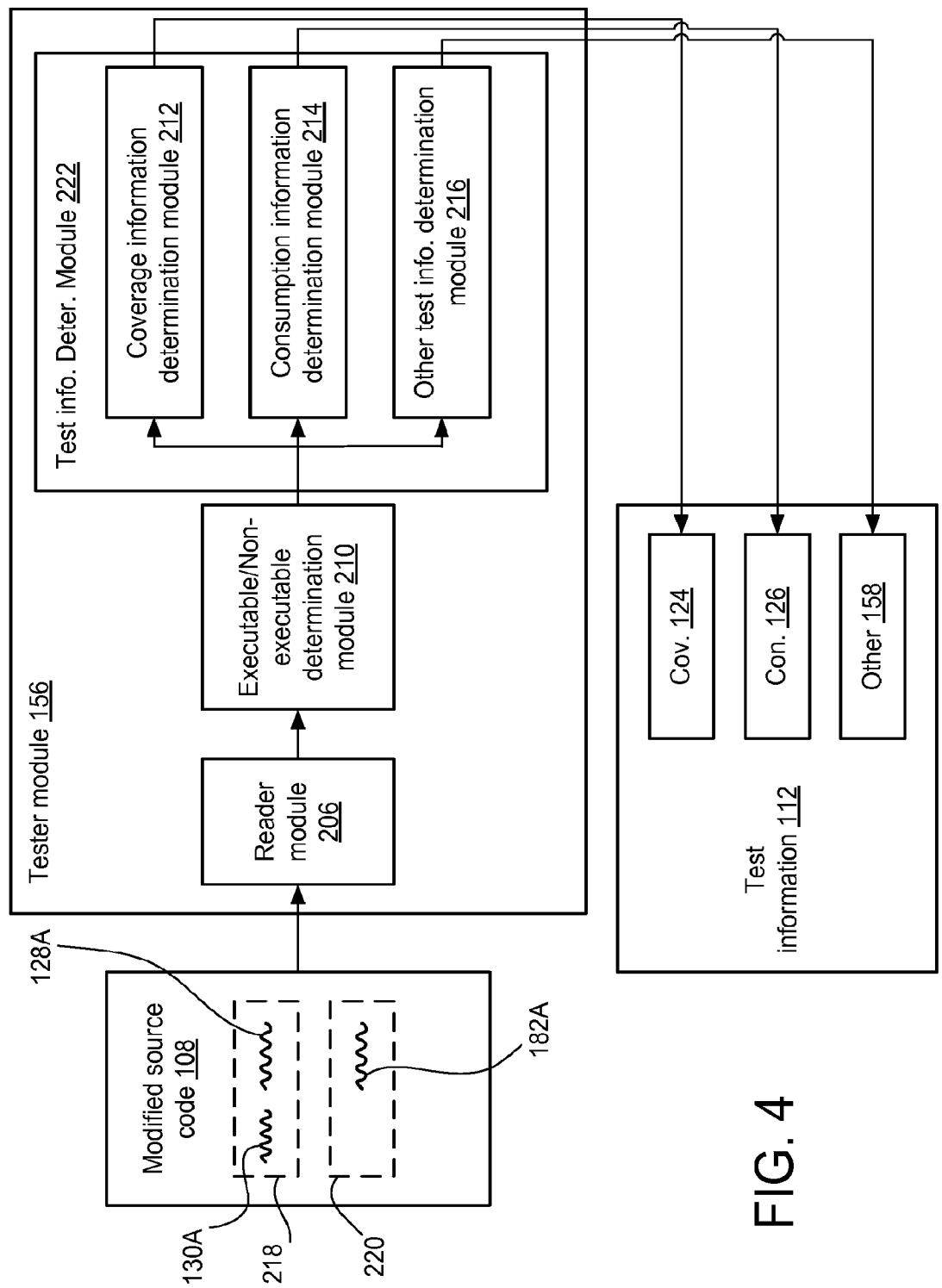
FIG. 4 is a block diagram of a tester module that is executed to test a source, in accordance with one embodiment of the present invention.

FIG. 4 is a block diagram of an embodiment of the tester module 156. A reader module 206 reads a line 218 of the modified source code 108 and another line 220 of the modified source. Upon reading the line 218, an executable/non-executable (E/NE) determination module 210 determines that the line 218 includes the executable line 128A. For example, the E/NE determination module 210 determines that the instruction 130A is prepended to the executable line 128A to determine that the line 218 includes the executable line 128A.

Upon determining that the line 218 includes the executable line 128A, the E/NE determination module 210 sends the line 218 to a test information determination module 222. The test information determination module 218 reads the instruction 130A to determine whether the coverage information 124, the consumption information 126, the other test information 158, or a combination thereof is to be determined from the line 218. Upon determining that the coverage information 124 is to be determined, a coverage information determination module 212 generates the coverage information 124 by executing the executable line 128A. Upon determining that the consumption information 126 is to be determined, a consumption information determination module 214 generates the consumption information 126 by executing the executable line 128A. Upon determining that the other test information 158 is to be determined, and other test information determination module 216 generates the other test information 158 by executing the executable line 128A.

On the other hand, upon determining that the line 220 includes the non-executable line 182A, the E/NE determination module 210 avoids sending the line 220 to the test information determination module 222.

Figure 5:
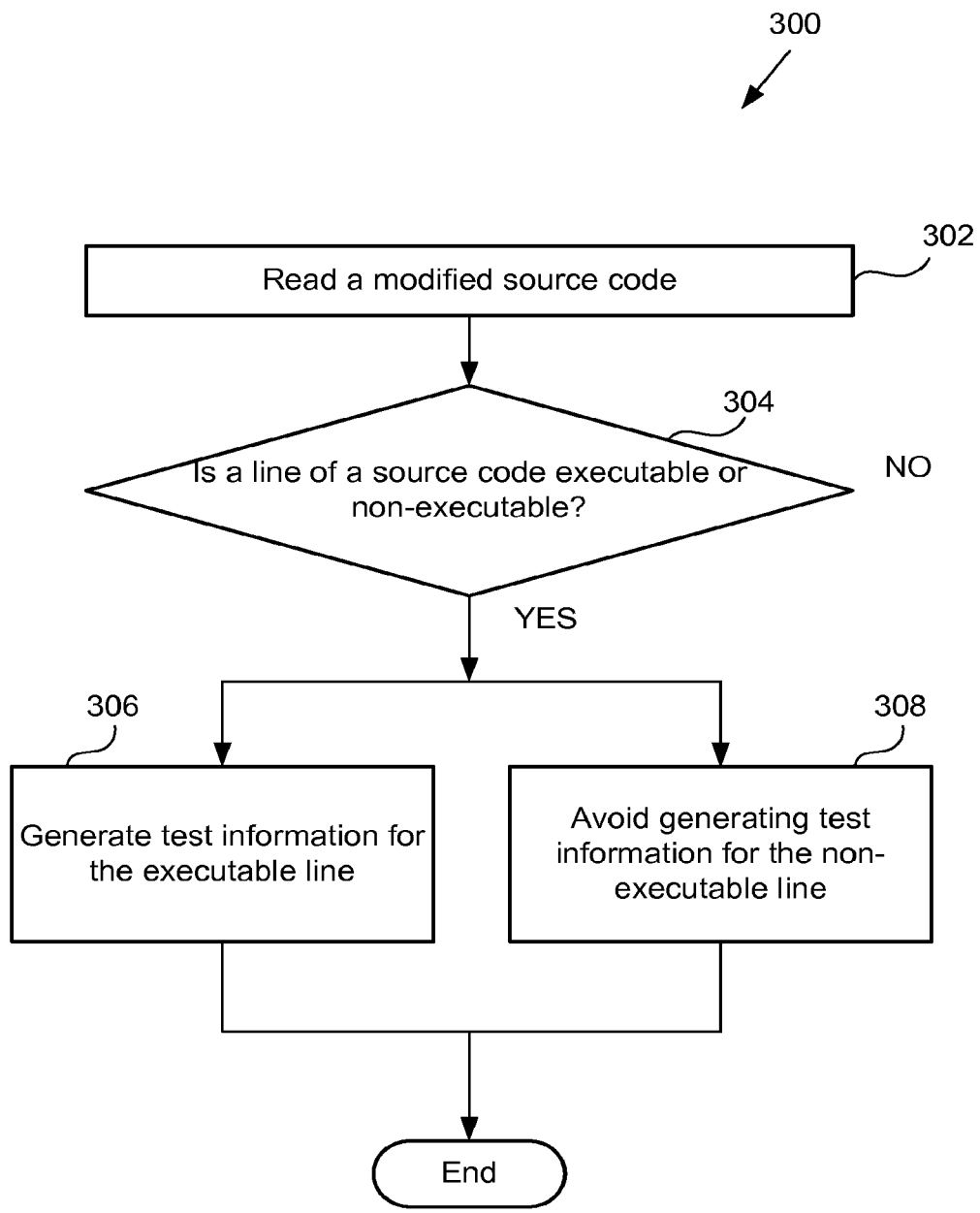
FIG. 5 is a flowchart of a method for distinguishing between an executable line and a non-executable line, in accordance with one embodiment of the present invention.

FIG. 5 is a flowchart of an embodiment of a method 300 for distinguishing between an executable line and a non-executable line. In an operation 302, a modified source code is read. Upon reading the modified source code, in operation 304, it is determined whether a line of a source code, within the modified source, is executable or non-executable. For example, it is determined whether the line of the source code is prepended by a collection function or another instruction. In response to determining that the line of the source code is executable, in operation 306, test information is generated for the executable line. On the other hand, upon determining that the line of the source code is non-executable, in an operation 308, any generation of test information regarding the non-executable line is avoided. The method 300 ends after operations 306 and 308.

It should be noted that although in the above-described embodiments, an instruction is prepended to an executable statement, in other embodiments, the instruction is appended to the executable statement.

FIG. 6 shows an embodiment of an ObjectiveC source code 320. The ObjectiveC source code 320 includes definitions 322 and 324. Thereafter, the ObjectiveC source code 320 includes an action statement 326 that includes a keyword 'id' and an object 'inn'. Then, the ObjectiveC source code 320 includes a condition statement 320 and action statements 330 and 332. The action statements 330 and 332 are executed when a condition of the condition statement 320 is true.

FIG. 7 shows an embodiment of a modified ObjectiveC source code 348, which is generated from the ObjectiveC source code 320. A 'printf' function 350 is appended to the action statement 326. Moreover, another 'printf' function 352 is prepended to the condition statement 328. Also, another 'printf' function 354 is prepended to the action statement 330 and another 'printf' function is prepended to the action statement 332.

Figure 8:
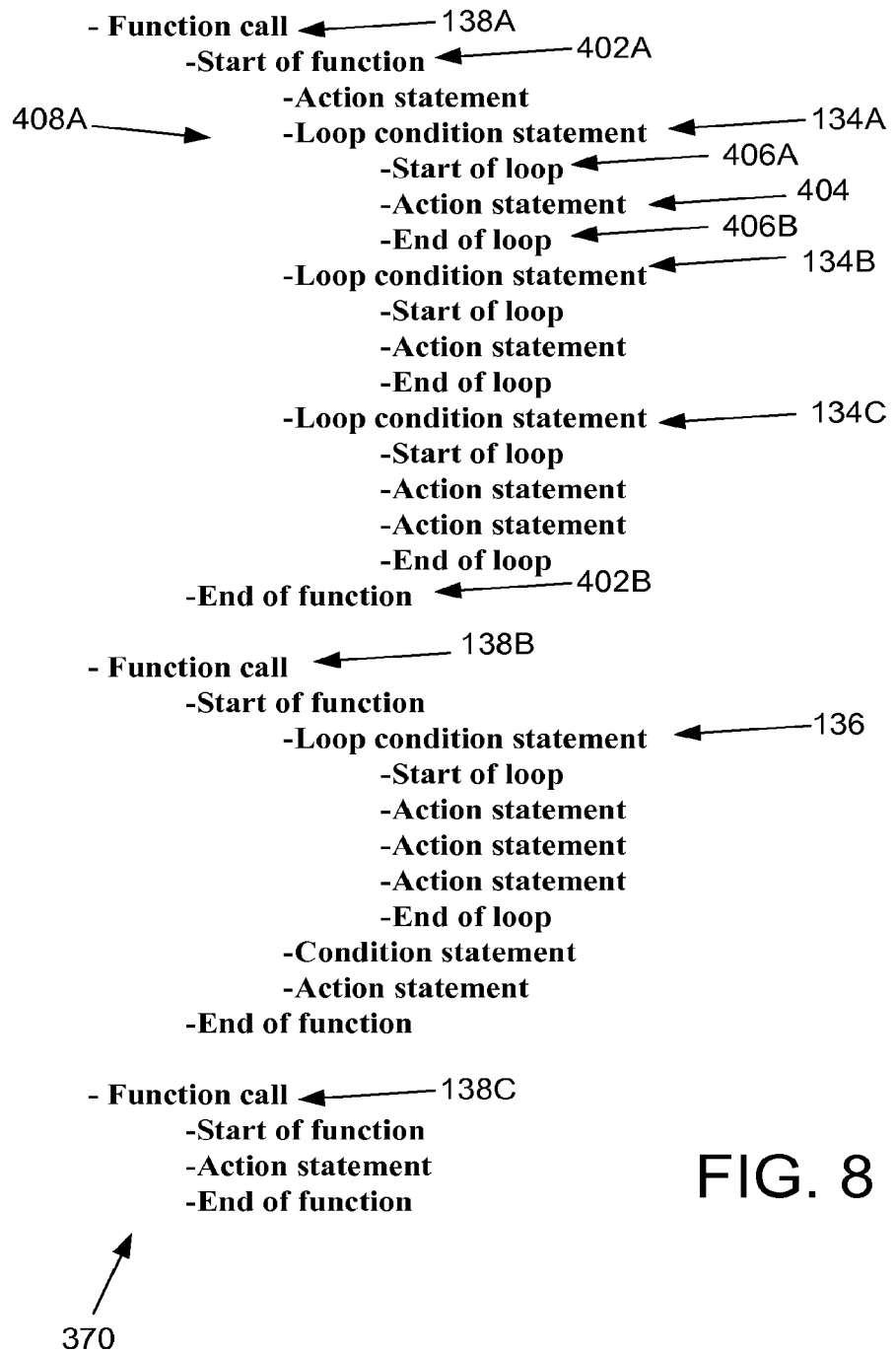
FIG. 8 shows a source code to illustrate a ratio of a number of a loop condition statement to a number of function calls within a source code, in accordance with one embodiment of the present invention.

FIG. 8 shows an embodiment of a source code 370. The source code 370 includes three function calls 138 and four loop condition statements 134 and 136. A function call is executed by a processor to call a function and then execute the function. For example, function call 138A is executed to call a function between a start of function 402A and an end of function 402B. Similarly, a loop condition statement is executed by a processor to execute any statements between a start of loop and an end of loop. For example, the loop condition statement 134A is executed to execute an action statement 404 between a start of loop 406A and an end of loop 406B.

Other test information for an executable line 408A that includes a loop condition statement 134A includes a ratio of a number of loop condition statement 134A to a number of function calls 138. For example, the ratio of a number, which is one, of the loop condition statement 134A to a number, which is 3, of the function calls 138 is 1/3. In one embodiment, other test information for the executable line 408A includes an inverse ratio of a number of function calls 138 to a number of loop condition statement 134A.

In some embodiments, other test information for the source code 370 includes a ratio of a number of loop condition statements 134 and 136 within the source code 370 to a number of function calls 138 within the source code 370. For example, the ratio of a number, which is four, of the loop condition statements 134 and 136 to a number, which is 3, of the function calls 138 is 4/3. In various embodiments, other test information for the source code 370 includes an inverse ratio of number of function calls 138 within the source code 370 to a number of loop condition statements 134 and 136 within the source code 370.

FIG. 9A is view of an embodiment of a portion of a table 450 that includes test information and FIG. 9B is a view of an embodiment of the remaining portion of the table 450. For example, all executable lines between a starting mathematical line numbered 73 and an ending mathematical line numbered 85 within a source code file that has a path "Clients/ios/shared/ZMobileEngine/ZMComponents/ZMStretchButton.m" consume 85.8% of a CPU time cycle. The mathematical line number 73 is in a column 454 and the mathematical line number 85 is in a column 456. As another example, an executable line within a mathematical line 2 of a source code file that has a path "Clients/ios/Source/WorldEdge.m" consumes 100% of a CPU time cycle.

A column 452 of the table 450 lists percentages of a CPU time cycle consumed by a number of lines between a mathematical starting line and a mathematical ending line. The column 454 of the table 450 lists a number of the mathematical starting line within a source code file, the column 456 lists a number of the ending mathematical line within the source code file, and a column 458 lists a path of the source code file.

A real user can determine from the table 450 that lines mentioned within portion 460 of the table 450 consume 100% of CPU time cycles and there may be some source code issues within these lines. For example, source code within the lines of portion 460 should be modified to reduce CPU time cycles.

FIG. 10 is a view of an embodiment of a table 500 that includes test information for each executable line. As shown, mathematical lines 1780 thru 1784, mathematical lines 1786-1788, and mathematical lines 1790, 1792, 1794, 1795, and 1797 are executable lines. Moreover, as shown, mathematical lines 1785, 1789, 1791, 1793, and 1796 are empty lines, which are examples of non-executable lines. Also, a mathematical line 1779 is an example of a non-executable line.

A column 502 of the table 500 shows mathematical line numbers ranging from 1779 thru 1797 of a source code. Moreover, a column 504 of the table 500 shows percentages of a CPU time cycle consumed by executable lines. For example, execution of an executable line having a condition statement "if((JK_AT_STRING_PTR(parseState)==endOfStringPtr)) {stopParsing=1;}" consumes 25% of a CPU time cycle. A real user may notice that the condition statement in the example consumes an usually higher percentage of a CPU time cycle than that consumed by the remaining executable mathematical lines 1780-1784, 1786-1788, 1790, 1794, 1795, and 1797. Accordingly, a real user may determine to review the condition statement in the mathematical line 1792 to debug the condition statement.

FIG. 11 is a view of an embodiment of a source code 550. Mathematical lines 10, 11, 18, 19, 23, 26, 27, and 29 are empty lines. Moreover, mathematical lines 12 and 13 include definitions. Also, mathematical lines 20 and 21 include a definition and declarations. Mathematical line 22, 24 and 28 include declarations. Mathematical lines 17 and 25 are executable lines. A column 552 provides a number of times executable lines 17 and 25 are executed during a test of the source code 550. For example, executable line 17 is executed for zero times and executable line 25 is executed for four times. A real user decides that the executable line 17 has not been tested at all and may avoid submitting the source code 550 for compilation.

Moreover, in one embodiment, in which test information indicates that an executable line of a source code is executed for a unusually large number of times, for example, compared to other executable lines of the source code, a real user may decide that there is an error in the executable line that is executed for the large number of times. In such a case, the real use may delete the executable line that is executed for the large number of times to save CPU time cycles.

Figure 12:
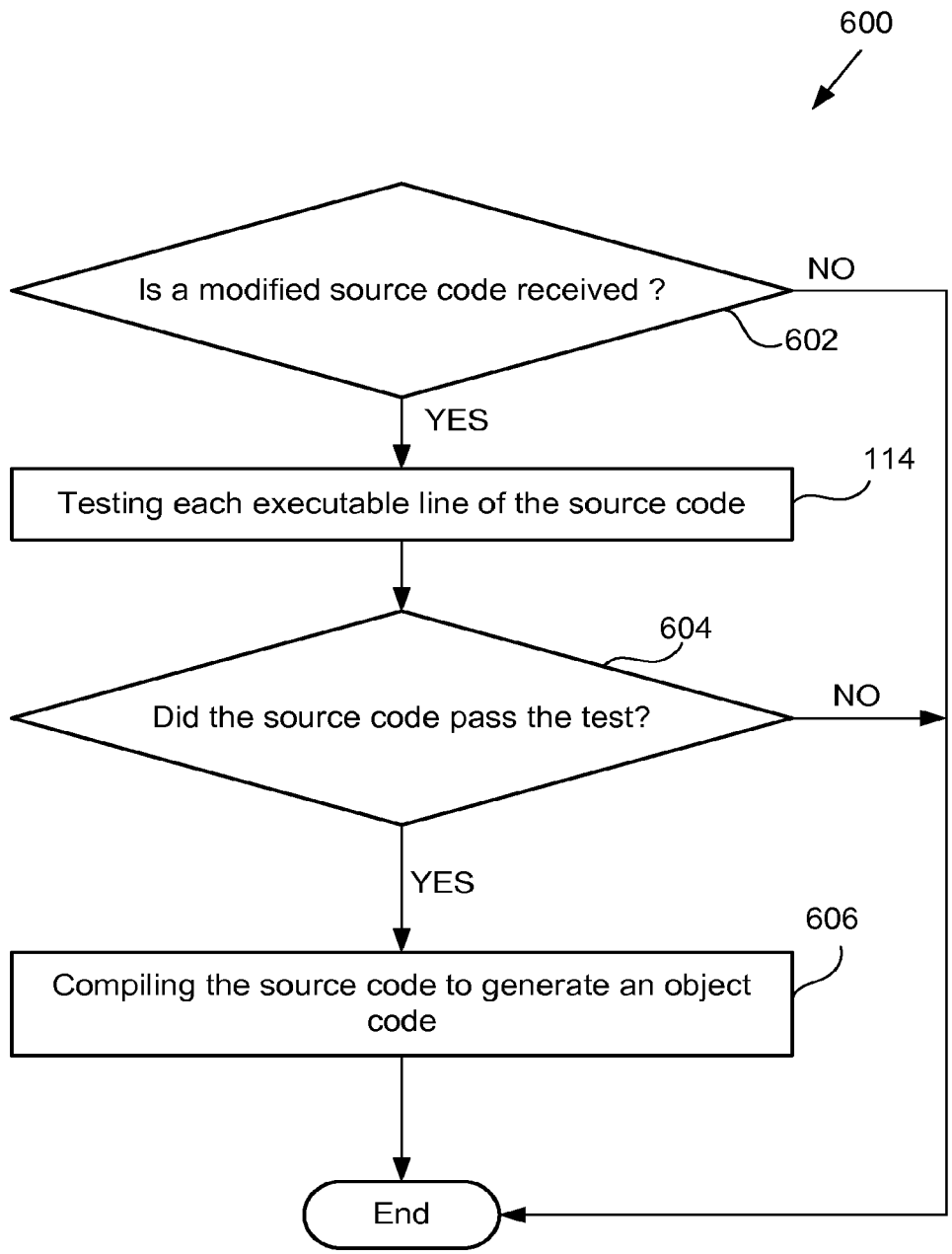
FIG. 12 is a flowchart of a method for compiling a source code that has passed a test, in accordance with one embodiment of the present invention.

FIG. 12 is a flowchart of an embodiment of a method 600 for compiling a source code that has passed a test. The method 600 is performed by one or more processors that include the tester module 156 (FIG. 2) and a compiler module (not shown). In operation 602, it is determined whether a modified source code is received. If the modified source code is not received, the method 600 ends.

On the other hand, if the modified source code is received, operation 114 is performed. In operation 604, it is determined whether a source code within the modified source code passed the test. In some embodiments, the operation 604 is performed by the compiler module. In one embodiment, the operation 604 is performed by the tester module 156.

If the source code failed the test, the method 600 ends. On the other hand, if the source code passed the test, in operation 606, the compiler module compiles the source code to generate an object code. The method 606 then ends.

It should be noted that in some embodiments, an execution is performed by a processor. Moreover, in various embodiments, a module, as used herein, is a computer program that is executed by a processor to perform the operations described herein as being performed by the module. However, in one embodiment, a module is implemented in hardware, such as within a PLD or an ASIC, or is implemented in firmware. For example, the parser module 147 and/or the instrumentor module 149 may be implemented within the processor 144 rather than being stored in memory device 142 (FIG. 2).

In one embodiment, a module, as used herein, is embodied as computer-readable code on a computer-readable medium. The computer-readable medium is any data storage device that can store data, which can be thereafter be read by a computer. Examples of the computer-readable medium include hard drives, network attached storage (NAS), read-only memory (ROM), random-access memory, a memory device, compact disc-ROMs (CD-ROMs), CD-recordables (CD-Rs), CD-rewritables (RWs), magnetic tapes and other optical and non-optical data storage devices. The computer-readable medium can include a non-transitory computer-readable tangible medium distributed over a network-coupled computer system so that the computer readable code is stored and executed in a distributed fashion.

It should be noted that various embodiments of the present invention may be practiced with various computer system configurations including hand-held devices, microprocessor systems, microprocessor-based or programmable consumer electronics, minicomputers, mainframe computers and the like. Some embodiments of the present invention can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein that form part of the invention are useful machine operations. Various embodiments of the present invention also relate to a device or an apparatus for performing these operations. The apparatus can be specially constructed for a specific purpose. The apparatus is selectively activated or configured by a computer program stored in the computer.

Although some operations are described in a specific order, it should be understood that other housekeeping operations may be performed in between operations, or operations may be adjusted so that they occur at slightly different times, or may be distributed in a system which allows the occurrence of the operations at various intervals, as long as the operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for testing a source code, comprising:
   receiving the source code, wherein the source code includes a plurality of executable lines and a plurality of non-executable lines, wherein each of the plurality of executable lines includes a functional statement, wherein the functional statement includes a condition for execution by a processor or includes an action for execution by the processor;
   parsing the source code to identify the executable lines and the non-executable lines of the source code; and
   upon identifying each of the executable lines and each of the non-executable lines, generating test information regarding each of the executable lines of the source code without testing each of the non-executable lines of the source code, wherein each of the non-executable lines is not tested by skipping each of the non-executable lines, wherein at least one of the non-executable lines defines a type of variable.

2. The method of claim 1, wherein the source code is configured to be compiled into an object code, wherein the object code is in a binary form, wherein the source code is not in the binary form.

3. The method of claim 1, wherein each of the executable lines is prepended with a collection function for collecting test information regarding the executable line, wherein each of the non-executable lines is not prepended with a collection function to avoid collecting test information regarding the non-executable line.

4. The method of claim 1, wherein each of the non-executable lines includes a comment, or is an empty line, or a definition, or a pre-processing directive, or a function prototype line, wherein the comment provides a meaning of a portion of one of the non-executable lines that has the comment, wherein the empty line does not include a character, wherein the definition names a function within the source code, wherein the pre-processing directive causes a compiler program to replace a line within the source code having a portion of the preprocessing directive with text within the processing directive, wherein the function prototype includes a name of a function, or a data type that is input to the function, or a data type that is output as a result of execution of the function.

5. The method of claim 1, wherein the action is performed when the condition is satisfied.

6. The method of claim 1, wherein the action is a logical operation or an arithmetic operation or an operation to assign a value to the variable.

7. The method of claim 1, wherein parsing the source code is performed to distinguish the executable lines from the non-executable lines.

8. The method of claim 1, wherein the test information includes coverage information, wherein the coverage information is regarding a number of times each executable line of the source code is executed during said generating the test information.

9. The method of claim 1, wherein the test information includes consumption information, wherein the consumption information is regarding a percentage of a time cycle of a hardware resource each executable line of the source code consumes during said generating the test information.

10. The method of claim 1, wherein each of the non-executable lines is ignored during said generating the test information.

11. The method of claim 1, wherein each of the non-executable lines is ignored during compilation of the source code.

12. The method of claim 1, whether the type of variable is an integer or a character.

13. The method of claim 1, wherein the source code includes a game code.

14. The method of claim 1, wherein each of the executable lines is a commentless line, a non-empty line, a definitionless line, and a function prototypeless line.

15. A computer system for generating test information from a source code, comprising:
    a memory device for storing the source code; and
    a processor coupled to the memory device,
    wherein the processor is configured to receive the source code, wherein the source code includes a plurality of executable lines and a plurality of non-executable lines, wherein each of the plurality of executable lines includes a functional statement, wherein the functional statement includes a condition for execution by a processor or includes an action for execution by the processor,
    wherein the processor is configured to parse the source code to identify the executable lines and the non-executable lines of the source code,
    wherein upon identifying each of the executable lines and each of the non-executable lines, the processor is configured to generate test information regarding each of the executable lines of the source code without testing each of the non-executable lines of the source code, wherein each of the non-executable lines is not tested by skipping each of the non-executable lines, wherein at least one of the non-executable lines defines a type of variable.

16. The computer system of claim 15, wherein the processor is configured to ignore each of the non-executable lines during generation of the test information.

17. The computer system of claim 15, wherein each of the non-executable lines includes a comment, or is an empty line, or a definition, or a pre-processing directive, or a function prototype line, wherein the comment provides a meaning of a portion of one of the non-executable lines that has the comment, wherein the empty line does not include a character, wherein the definition names a function within the source code, wherein the pre-processing directive causes a compiler program to replace a line within the source code having a portion of the preprocessing directive with text within the processing directive, wherein the function prototype includes a name of a function, or a data type that is input to the function, or a data type that is output as a result of execution of the function.

18. A non-transitory computer-readable medium containing program instructions for causing a computer to perform a method of:
  receiving a source code, wherein the source code includes a plurality of executable lines and a plurality of non-executable lines, wherein each of the plurality of executable lines includes a functional statement, wherein the functional statement includes a condition for execution by a processor or includes an action for execution by the processor;
  parsing the source code to identify the executable lines and the non-executable lines of the source code; and
  upon identifying each of the executable lines and each of the non-executable lines, generating test information regarding each of the executable lines of the source code without testing each of the non-executable lines of the source code, wherein each of the non-executable lines is not tested by skipping each of the non-executable lines, wherein at least one of the non-executable lines defines a type of variable.

19. The non-transitory computer-readable medium of claim 18, wherein each of the non-executable lines is ignored during said generating the test information.

20. The non-transitory computer-readable medium of claim 18, wherein each of the non-executable lines includes a comment, or is an empty line, or a definition, or a pre-processing directive, or a function prototype line, wherein the comment provides a meaning of a portion of one of the non-executable lines that has the comment, wherein the empty line does not include a character, wherein the definition names a function within the source code, wherein the pre-processing directive causes a compiler program to replace a line within the source code having a portion of the preprocessing directive with text within the processing directive, wherein the function prototype includes a name of a function, or a data type that is input to the function, or a data type that is output as a result of execution of the function.

\* \* \* \* \*